C. C. BURROUGHS.

CORN SHELLER.

No. 9,918. Reissued Nov. 1, 1881.

WITNESSES:

Stephen A. Powell

W. L. Bennem

INVENTOR

Caleb C. Burroughs by C. S. Renwick

ATTORNEY.

N. PETERS, Photo-Lithographer, Washington, D. C.

UNITED STATES PATENT OFFICE.

CALEB C. BURROUGHS, OF DECATUR, ILLINOIS.

CORN-SHELLER.

SPECIFICATION forming part of Reissued Letters Patent No. 9,918, dated November 1, 1881.

Original No. 184,756, dated November 28, 1876. Application for reissue filed April 9, 1881.

*To all whom it may concern:*

Be it known that I, CALEB C. BURROUGHS, of Decatur, in the county of Macon and State of Illinois, have invented a new and useful Improvement in Corn Shellers, which improvement is fully set forth in the following specification, reference being had to the accompanying drawings.

My invention relates to an improvement in that class of corn-shellers in which a conical cylinder is used; and it consists of certain combinations of devices which are set forth in detail at the close of this specification. In order that these combinations may be understood I have represented in the accompanying drawings and will proceed to describe a corn-sheller embodying all of them in the best form known to me at the date of my application for the original Patent No. 184,756.

Figure 1:
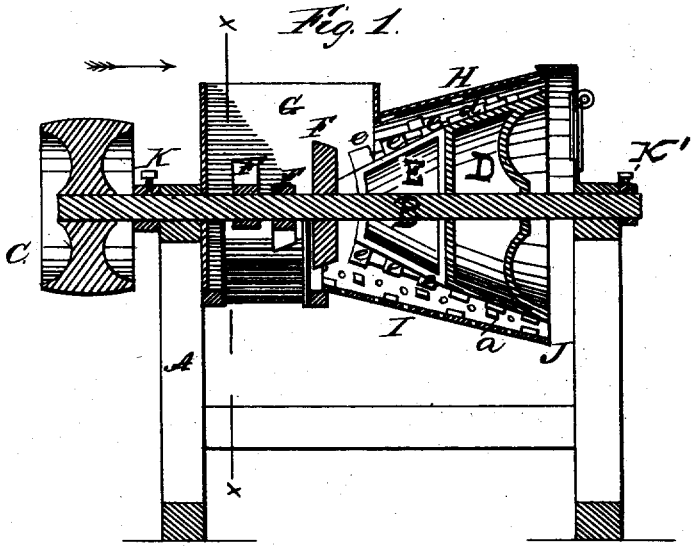
Figure 2:
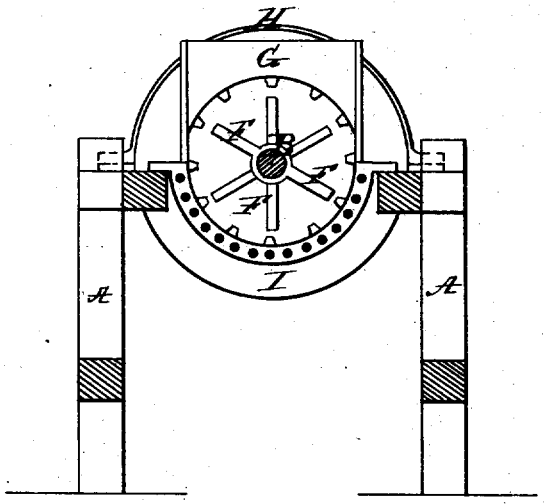

In said drawings, Figure 1 represents a central vertical longitudinal section of said corn-sheller; and Fig. 2 represents a vertical transverse section of the same at the line *x x* of Fig. 1, and looking in the direction of the arrow in that figure.

The principal members of the corn-sheller represented in the drawings are the frame A, the horizontal cylinder-shaft B, the feed-hopper G, the beaters or feeders F, the perforated feeder-concave L, the concave perforated cylinder H I, the shelling-cylinder D E, the driving-pulley C, and the adjusting-collars K K′. The cylinder-shaft B is horizontal, and is fitted to turn in suitable bearings of the frame A. To this shaft the driving-pulley C is secured, and the shaft is fitted with the adjusting-collars K K′. The feeders F and the shelling-cylinder D E are secured to the cylinder-shaft B.

The feeders F consist of arms projecting radially from the shaft, so that the ears of corn may drop into the spaces between them, instead of being supported in the form of an arch upon the surface of a cylinder, from which short teeth projected, as the ears of corn were supported in previous machines. These beaters or feeders are surmounted by the hopper G, into which the ears of corn are thrown; and the feeders are inclosed beneath by the feeder-concave L, which is perforated with slots or holes large enough to permit shelled corn to pass through them. The feeder-arms in the said machine are set helically on the horizontal shaft B, so that they not only beat or rub upon the ears of corn and beat or rub them in contact with the feeder-concave beneath, but also tend to force them longitudinally of the shaft into the space between the shelling-cylinder and its concave or casings, thereby feeding them to the shelling-cylinder.

The shelling-cylinder D E is conical, and is surrounded by the cylinder-concave, which is made in two parts, one of said parts, H, forming the upper casing of the shelling-cylinder, and the other part, I, forming the lower casing therefor. Both parts are provided on their interiors with shelling-teeth, and the lower casing, I, is, in addition, suitably perforated with holes for the discharge of the shelled corn. The smaller end of the cylinder-concave opens into the hopper and feeder concave, so as to receive the corn therefrom. The larger head of the upper part of the cylinder-concave is closed, but an opening is left at the larger head of the lower part, I, of the cylinder-concave, so that the cobs may be discharged at J. The shelling-cylinder is fitted at its exterior with shelling-teeth *d e*.

In order that the last part of my invention may be embodied in the machine, the shelling-cylinder is constructed of two sections, D E, of different tapers, their profiles forming different angles with the axis of the shaft B to which the shelling-cylinder is secured. The larger section, D, has teeth *d d* of uniform length. The smaller cylinder-section, E, has the line of its profile forming a less acute angle with the axis of the shaft B than the angle formed by the line of profile of the larger cylinder-section, D, so that the taper of the smaller section is more rapid than that of the larger section, and the width of the space between the surface of the smaller section and the surface of the cylinder-concave surrounding it diminishes progressively in the direction of the discharge of the cobs. The teeth *e e* of the smaller section are not of uniform length, but increase in length and thickness toward the smaller end of the cylinder.

The cylinder-shaft and shelling-cylinder can be moved horizontally in the cylinder-concave and secured in any desired position by the adjusting-collars K K′, so as to make the space between the shelling-cylinder and the cylinder-concave greater or less, as may be required, according to the condition of the grain. These collars are secured to the shaft by set-screws. When the machine is at work the endwise strain of the shaft and shelling-cylinder is sustained by the collar K, while the collar K′ is important only for preventing the too great play of the shaft.

The feeders prepare the corn for the action of the shelling-cylinder, partly shelling it, and feeding or forcing the unshelled portions to the shelling-surfaces of the shelling-cylinder and concave. As the shaft B is horizontal and the feeder-concave is perforated, such grain as is shelled from the cobs by the feeders drops by gravity directly through the openings of the feeder-concave L, which are large enough for that purpose, so that such grain is at once removed from the machine. The larger portion of the grain shelled from the cobs by the action of the shelling-cylinder and cylinder concave also drops by gravitation through the perforations of the lower part, I, of the cylinder-concave, which are large enough for that purpose. The change in the taper of the two sections of the shelling-cylinder in connection with the increased size of the teeth of the smaller section, has, in my opinion, the effect of giving a larger shelling-surface at the throat of the machine or entrance to the cylinder-concave and approximately equalizes the shelling action of the two sections, because the increase in the length and thickness of the teeth of the smaller section tends to compensate for the smaller diameter of the surface from which they project.

I claim as my invention—

1. The combination, substantially as before set forth, of the hopper, the horizontal shelling-cylinder shaft extended under the hopper, the feeders mounted on said shaft under the hopper and having spaces between them and the perforated feeder-concave.

2. The combination, substantially as before set forth, of the hopper, the horizontal shelling-cylinder shaft extended under the hopper, the feeders mounted on said shaft under the hopper and having spaces between them, the perforated feeder-concave, the toothed shelling-cylinder, and the perforated toothed cylinder-concave.

3. The combination, substantially as before set forth, of the horizontal cylinder-shaft, the feeders, the hopper, the perforated feeder-concave, the toothed shelling-cylinder, the perforated toothed cylinder concave, and the adjusting-collar which sustains the endwise strain of the shelling-cylinder and its shaft.

4. The shelling-cylinder constructed substantially as before set forth, the angle of the taper of its smaller section being greater than that of its larger section, and being provided with teeth of progressively less length and thickness toward the larger end of the cylinder.

In testimony whereof I have hereto set my hand this 22d day of March, A. D. 1881.

CALEB C. BURROUGHS.

Witnesses:
K. H. ROBY,
W. C. OUTTEN.